(12) United States Patent
Schwai

(10) Patent No.: US 8,746,442 B2
(45) Date of Patent: Jun. 10, 2014

(54) CONVEYOR BELT ROLLERS WITH TWO SURFACE MATERIALS

(75) Inventor: Jeffrey S. Schwai, Walkersville, MD (US)

(73) Assignee: Laitram, L.L.C., Harahan, LA (US)

( * ) Notice: Subject to any disclaimer, the term of this patent is extended or adjusted under 35 U.S.C. 154(b) by 84 days.

(21) Appl. No.: 13/418,531

(22) Filed: Mar. 13, 2012

(65) Prior Publication Data

US 2013/0240330 A1 Sep. 19, 2013

(51) Int. Cl.
*B65G 17/24* (2006.01)

(52) U.S. Cl.
USPC ............................... 198/779; 193/37; 492/28

(58) Field of Classification Search
USPC ............ 198/850–853, 608, 624, 779; 193/37; 492/28
See application file for complete search history.

(56) References Cited

U.S. PATENT DOCUMENTS

| | | | | |
|---|---|---|---|---|
| 4,239,203 | A | * | 12/1980 | Uchida ........................ 271/122 |
| 4,271,960 | A | * | 6/1981 | Chalich ........................ 198/779 |
| 5,096,050 | A | | 3/1992 | Hodlewsky |
| 5,261,525 | A | | 11/1993 | Garbagnati |
| 5,267,008 | A | * | 11/1993 | Rebres et al. ................... 492/28 |
| 5,507,383 | A | | 4/1996 | Lapeyre et al. |
| 6,148,990 | A | * | 11/2000 | Lapeyre et al. ............... 198/779 |
| 6,968,941 | B2 | | 11/2005 | Fourney |
| 6,997,306 | B2 | * | 2/2006 | Sofranec et al. .............. 198/779 |
| 7,234,587 | B2 | | 6/2007 | Fandella |
| 7,540,368 | B2 | | 6/2009 | Weiser |
| 7,556,136 | B2 | | 7/2009 | Marshall et al. |
| 7,588,137 | B2 | * | 9/2009 | Fourney ....................... 198/779 |
| 7,824,514 | B2 | * | 11/2010 | Venkitaraman et al. ........ 492/28 |
| 7,861,849 | B2 | | 1/2011 | Fourney |
| 7,886,892 | B2 | | 2/2011 | Fourney |
| 8,328,177 | B2 | * | 12/2012 | Claris .............................. 193/37 |

\* cited by examiner

*Primary Examiner* — James R Bidwell
(74) *Attorney, Agent, or Firm* — James T. Cronvich

(57) ABSTRACT

A conveyor belt and a belt module having multiple roller sets, each roller set including a bottom roller in contact with an axially elongated two-material top roller. The periphery of the top roller has a high-friction peripheral surface separated by a central durable, low-friction peripheral surface in contact with the bottom roller. Driving the bottom roller in a first direction causes rotation of the top roller in an opposite angular direction.

23 Claims, 8 Drawing Sheets

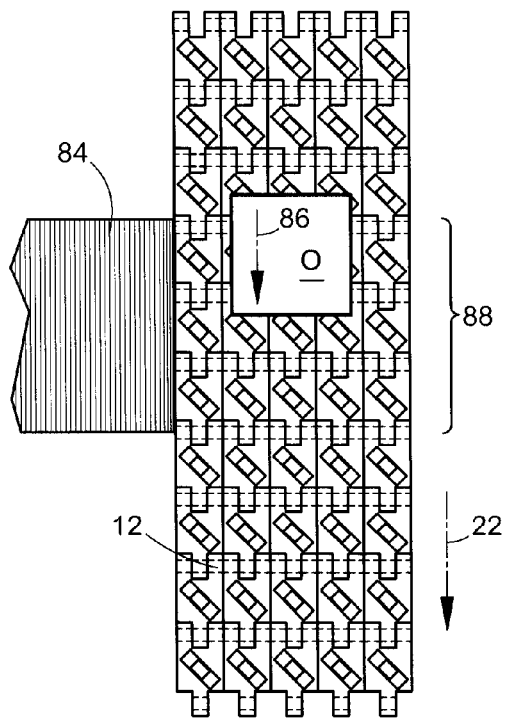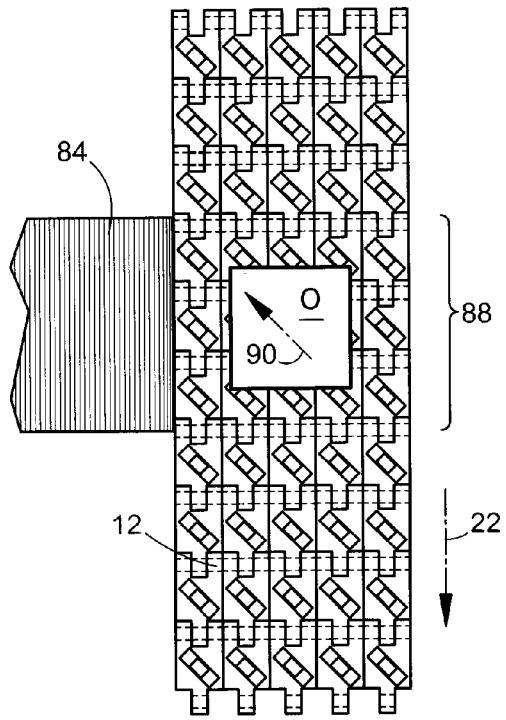
FIG. 6A  FIG. 6B
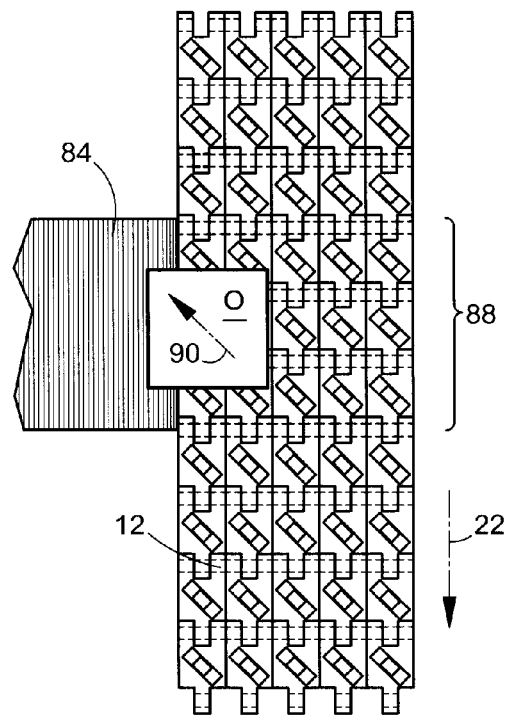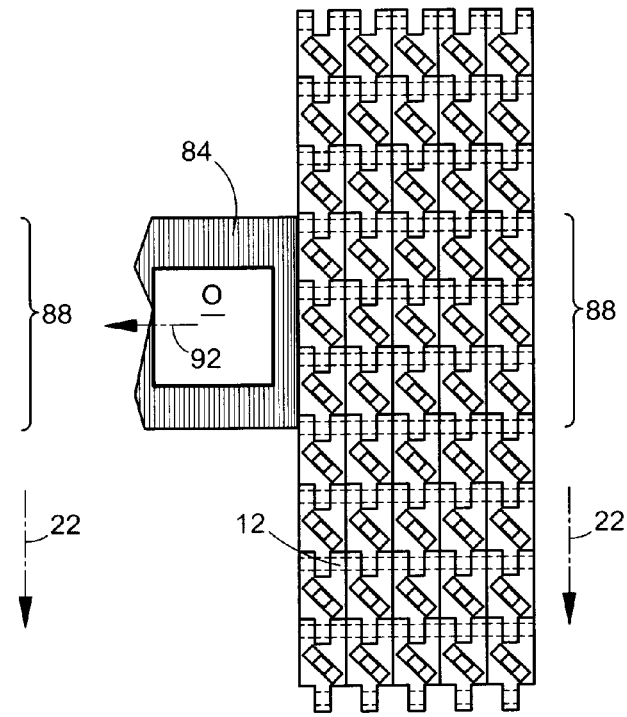
FIG. 6C  FIG. 6D

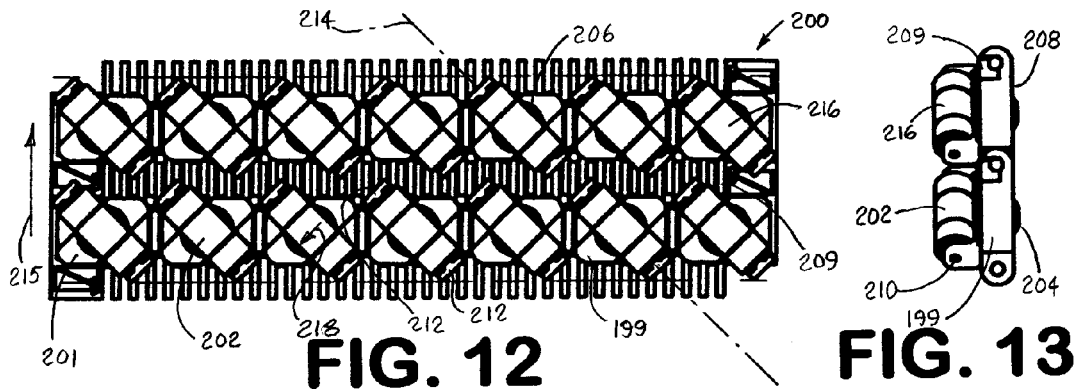
FIG. 12
FIG. 13
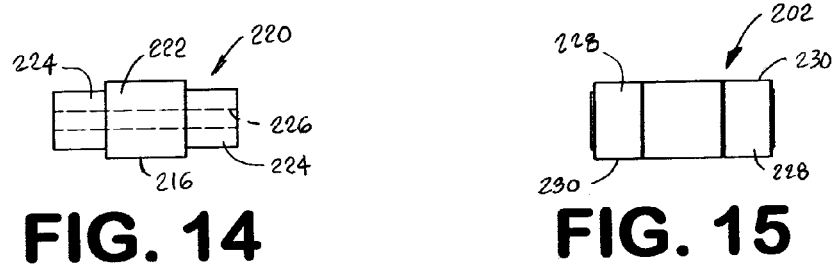
FIG. 14
FIG. 15
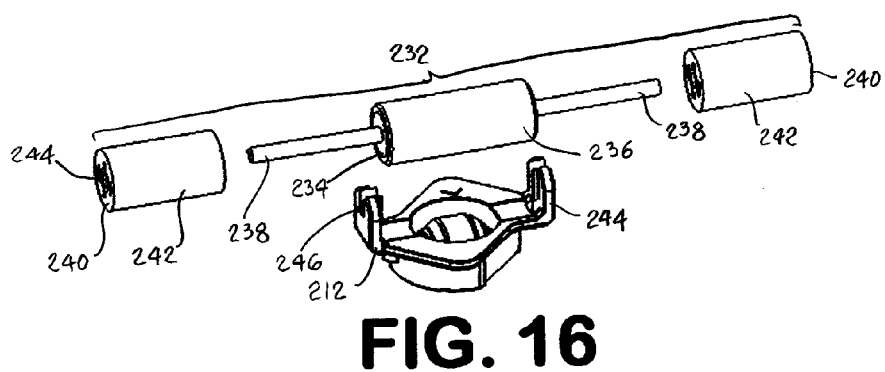
FIG. 16
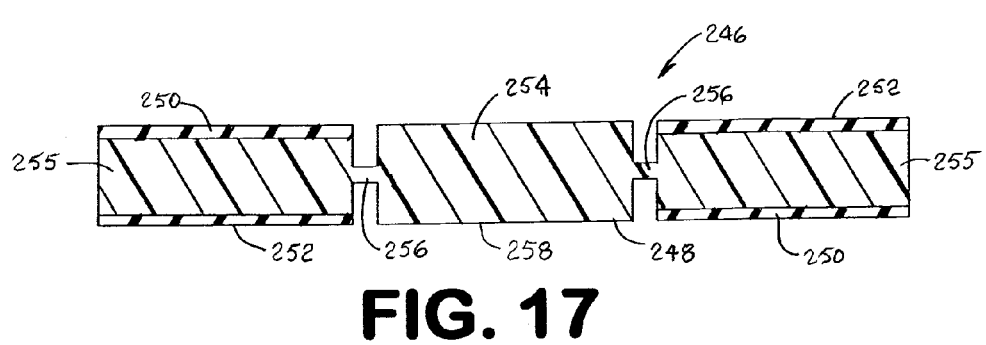
FIG. 17

CONVEYOR BELT ROLLERS WITH TWO SURFACE MATERIALS

BACKGROUND

The invention relates generally to power-driven conveyors and more particularly to modular conveyor belts having sets of stacked rollers to propel objects rearward along the conveyor belt.

Conveyor belts sometimes include fixed, stacked rollers that are used to propel objects rearward along the conveyor belt as it advances. The roller at the bottom of the stack rolls on a bearing surface underlying the conveyor belt as the conveyor belt advances along a conveyor. The forward rotation of the rolling bottom roller contacting the top roller in the stack causes the top roller to rotate in the opposite direction to propel objects conveyed atop the rollers to be pushed rearward on the conveyor belt. As the top and bottom rollers wear, contact between the bottom rollers and the top rollers deteriorates.

SUMMARY

These shortcomings are addressed by a conveyor belt embodying features of the invention. Such a conveyor belt comprises multiple roller sets, each of which includes a top roller at a top side of the belt and a bottom roller below the top roller. The top and bottom rollers are mounted for rotation on parallel axes. The top roller has a periphery divided into a high-friction peripheral surface and a durable peripheral surface. The bottom roller contacts the durable peripheral surface of the top roller so that driving the bottom roller in a first direction causes rotation of the top roller in an opposite second direction.

In another aspect of the invention, a conveyor belt module comprises one or more cavities extending through the thickness of the module and opening onto opposite top and bottom sides of the module. A set of top and bottom rollers is associated with each of the cavities. Each bottom roller is received in one of the cavities, and each top roller is affixed to the belt module over the cavity and in contact with the bottom roller. The top roller has a periphery divided into a high-friction peripheral surface and a durable peripheral surface, the bottom roller contacting the durable peripheral surface.

In another aspect of the invention, a conveyor-belt roller for contacting another roller comprises a cylindrical body elongated along an axis of rotation. The roller has a periphery divided into a central durable peripheral surface flanked axially by two high-friction peripheral surface portions.

BRIEF DESCRIPTION OF THE DRAWINGS

The disclosed conveyor belts and conveyors can be understood with reference to the following drawings. The components in the drawings are not necessarily to scale.

FIGS. 6A-6D are schematic views sequentially illustrating diverting of an object using the conveyor of FIG. 1.

FIG. 12 is a top plan view of a portion of a conveyor belt having top rollers made of two materials.

FIG. 13 is a side elevation view of the conveyor belt of FIG. 12.

FIG. 14 is a side view of the core of a top roller as in the conveyor belt of FIG. 12.

FIG. 15 is a side view of the top roller of FIG. 14 with high-friction treads.

FIG. 16 is an exploded view of an elongated, two-material top roller usable in a conveyor belt as in FIG. 12.

FIG. 17 is a cross-sectional view of another version of an elongated, two-material top roller usable in a conveyor belt as in FIG. 12.

DETAILED DESCRIPTION

Described in the following are conveyor belts having rollers that can be used to displace objects conveyed by the belts. In some embodiments, a conveyor belt comprises roller sets including top and bottom rollers, with the bottom roller extending below a bottom surface of the belt and the top roller extending above a top surface of the belt. The top and bottom rollers contact each other such that when the bottom roller is driven in a first angular direction, the top roller rotates in a second, opposite angular direction. In cases in which the rollers rotate in a direction that forms an angle with a longitudinal direction of the belt, the top rollers can be used to displace objects in a transverse and rearward direction such that objects can be diverted with relatively high diverting angles. In cases in which the rollers rotate in a direction parallel to the longitudinal direction of the belt, objects can be displaced on the belt in a direction opposite the direction of belt travel.

In the following, various embodiments of conveyor belts are disclosed. Although specific embodiments are presented, those embodiments are mere example implementations of the disclosed belts and it is noted that other embodiments are possible. All such embodiments are intended to fall within the scope of this disclosure.

Figure 1:
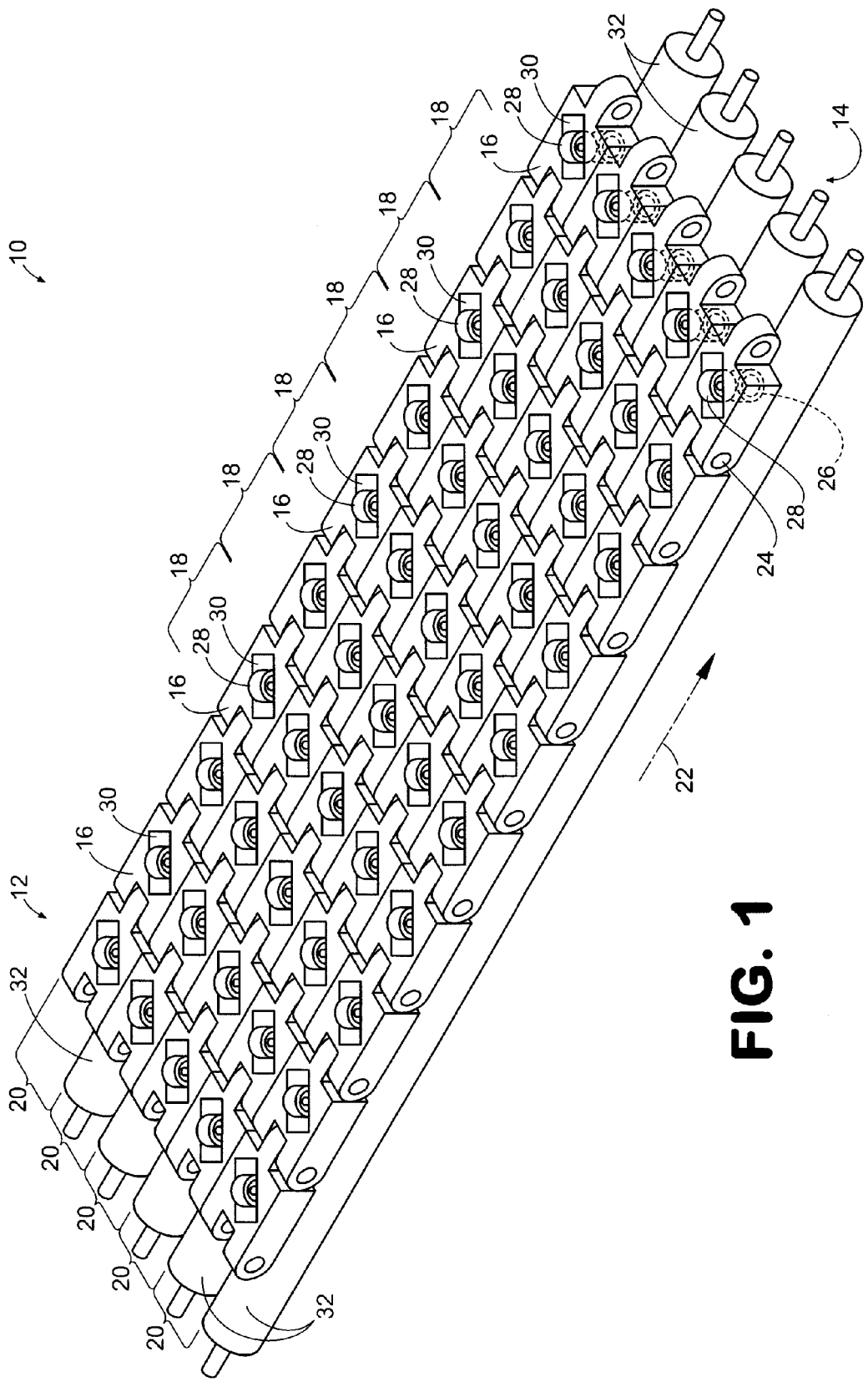
FIG. 1 is a top perspective view of a first embodiment of a portion of a conveyor.

Referring to the figures, in which like numerals indicate corresponding parts throughout the several views, FIG. 1 illustrates an embodiment of a conveyor 10 that can be used to divert objects. As indicated in FIG. 1, the conveyor 10 comprises a conveyor belt 12 and a drive mechanism 14 with which the belt can interact. In the embodiment of FIG. 1, the conveyor belt 12 comprises a plurality of conveyor belt modules 16 that are linked together to form the belt. The modules 16 are aligned in transverse rows 18 that extend across a width of the belt 12, and in longitudinal columns 20 that extend along a longitudinal direction of the belt, which coincides with the direction of belt travel indicated by arrow 22. By way of example, the modules 16 are pivotally connected to adjacent modules along the longitudinal direction of the belt 12 with transverse shafts 24. The modules 16 include roller sets that comprise a first or bottom roller 26 and second or top roller 28 that are arranged in a vertically-stacked orientation within an inner space 30 of the modules.

Figure 7:
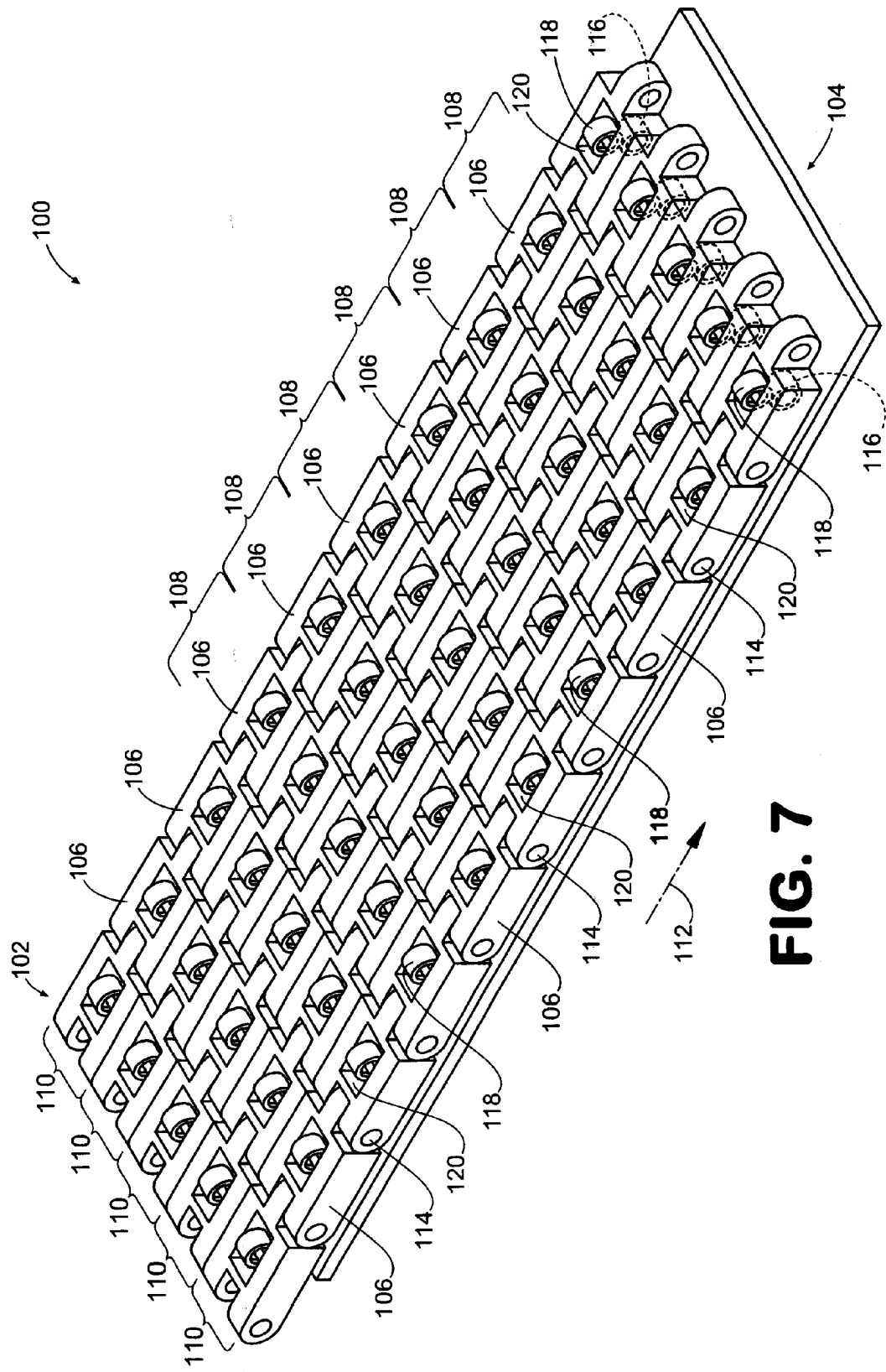
FIG. 7 is a top perspective view of a second embodiment of a portion of a conveyor.

The drive mechanism 14 is used to drive the bottom and top rollers 26, 28 of the conveyor belt modules 16. As indicated in FIG. 1, the drive mechanism 14 can comprise multiple longitudinal rollers 32 having axes of rotation that are parallel to the longitudinal direction of the conveyor belt 12 and that align with the columns 20 of conveyor belt modules 16 such that one longitudinal roller is provided for each belt column. As described in greater detail below, when the longitudinal rollers 32 are placed in contact with the bottom rollers 26 while the belt 12 is moving, frictional forces between the longitudinal rollers and the bottom rollers cause the bottom rollers to rotate, which results in opposite rotation of the top rollers 28. In at least some embodiments, the longitudinal rollers 32 have high-friction outer surfaces that reduce slip between the longitudinal rollers 32 and the bottom rollers 26. In alternative embodiments, the drive mechanism can comprise a friction plate that is used to rotate the bottom rollers 26. An example of such a friction plate is illustrated in FIG. 7.

Figure 2:
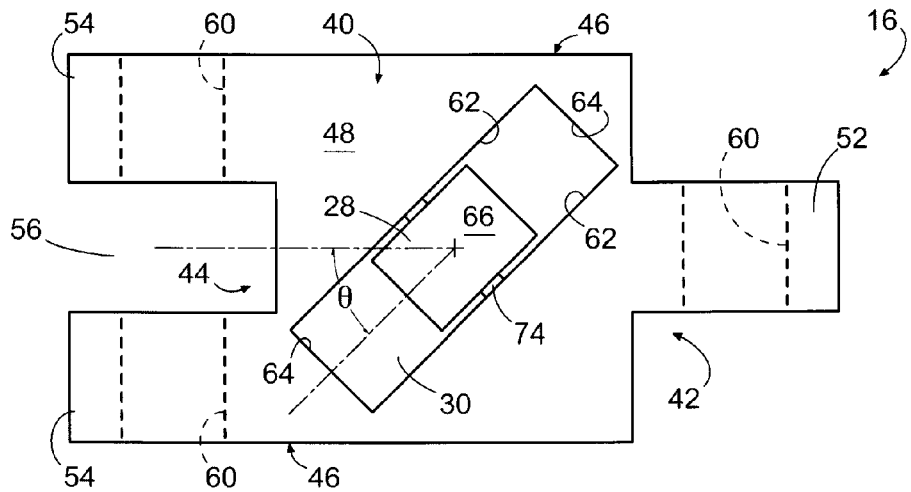
FIG. 2 is top view of an embodiment of a conveyor belt module used in the conveyor of FIG. 1.
Figure 3:
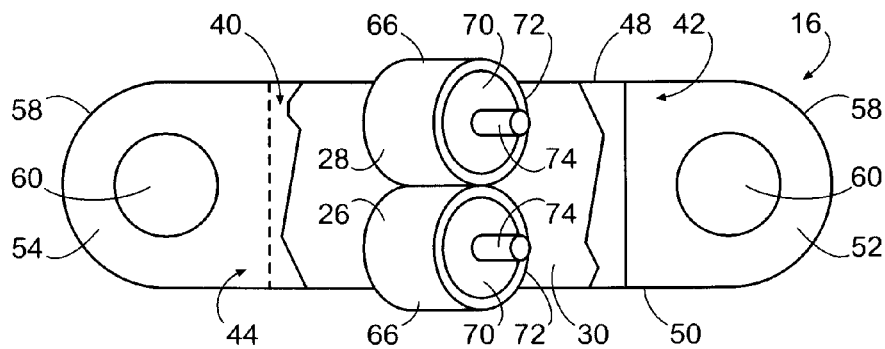
FIG. 3 is a side view of the conveyor belt module of FIG. 2.

FIGS. 2 and 3 illustrate an example embodiment for the conveyor belt module 16. As indicated in those figures, the module 16 comprises a body 40 having a front end 42, a rear end 44, and opposed lateral sides 46. Furthermore, the body 40 includes a top surface 48 and a bottom surface 50. Although particular spatial terminology such as "front" and "rear" have been used, those terms are used herein to describe the module 16 in its orientation shown in FIG. 1. Therefore, the spatial terms are not absolute and should not be interpreted as such.

In some embodiments, the module body 40 is unitarily constructed from a single piece of material, such as a polymeric material. In other embodiments, the body 40 comprises separate pieces, for example separate halves, that are connected together to form an integrated body. In such embodiments, the body 40 can be formed from a polymeric and/or metal material.

As shown most clearly in FIG. 2, the conveyor belt module 16 further includes connection portions that extend from body 40. In the embodiment of FIGS. 2 and 3, the module 16 comprises a single connection portion 52 that extends from the front end 42 of the body 40 and two connection portions 54 that extend from the rear end 44 of the body separated by a gap 56. With such a configuration, the modules 16 are adapted for linking to each other along the longitudinal direction of the belt. Specifically, the connection portion 52 of one module 16 can be received in the gap 56 of an adjacent module, the connection portion 52 of that adjacent module 16 can be received in the gap 56 of the next adjacent module 16, and so forth, as indicated in FIG. 1. As shown most clearly in FIG. 3, each of the connection portions 52, 54 includes a rounded outer surface 58 and a transverse opening 60 that is adapted to receive a transverse shaft, such as shaft 24 shown in FIG. 1. When the diameter of the transverse shaft is smaller than the openings 60, the modules 16 can pivotally rotate relative to the shaft and vice versa.

The module body 40 further defines the inner space 30 first identified in relation to FIG. 1. As indicated in FIG. 2, the inner space 30 can, in some embodiments, comprise a generally rectangular cross-section, when viewed from the top or bottom, defined by opposed side walls 62 and opposed end walls 64. As further indicated in FIG. 2, the side walls 62 are arranged at an angle relative to the lateral sides 46 of the module body 40, and therefore relative to a longitudinal axis of the module 16.

As is apparent from FIGS. 2 and 3, the bottom and top rollers 26, 28 are at least partially contained within the inner space 30 defined by the module body 40. As indicated in FIG. 3, outer surfaces 66 of the rollers 26, 28 contact each other such that rotation of one roller in a first direction causes opposite rotation of the other roller. A portion of the bottom roller 26 extends below the bottom surface 50 of the body 40 and a portion of the top roller 28 extends above the top surface 48 of the body. With such a configuration, the drive mechanism described in relation to FIG. 1 can contact the bottom roller 26 to cause it to rotate, and objects supported by the conveyor belt in which the module 16 is used can be displaced by the top roller 28.

Each roller can comprise a roller body 70 constructed of a polymeric or metal material that provides structure to the roller, and an outer layer 72 that is provided about an outer surface of the roller body and that forms the outer surface 66. In some embodiments, the outer layer 72 of each roller 26, 28 is composed of a high-friction material that reduces slip with mechanisms and/or objects it contacts. In other embodiments, only the outer layer 72 of the bottom roller 26 is a high-friction material so as to enable desired slipping between the top roller 28 and the objects it supports. As illustrated in both FIGS. 2 and 3, each roller 26, 28 is mounted within the inner space 30 on a roller shaft 74 that is supported by the module body 40. In some embodiments, the shafts 74 are supported by openings (not shown) formed in the body 40. In other embodiments, the shafts 74 are supported by brackets (not shown) provided within the inner space 30. Regardless, the shafts 74 are supported such that their associated rollers 26, 28 are placed in firm contact with each other to ensure that rotation of one roller (e.g., the bottom roller) will cause opposite rotation of the other roller (e.g., the top roller).

As further illustrated in FIGS. 2 and 3, the shafts 74, and therefore their associated rollers 26, 28, are supported at an angle $\theta$, relative to a longitudinal axis of the module 16 and the conveyor belt in which it is used. In some embodiments, the angle $\theta$ can be any angle from about 1°, in which case the shaft 74 is nearly perpendicular to the longitudinal axis of the module 16, to about 89°, in which case the shaft is nearly parallel to the longitudinal axis of the module. As described in greater detail below, the angle that is selected affects the speed with which objects are diverted from the conveyor belt.

Figure 4:
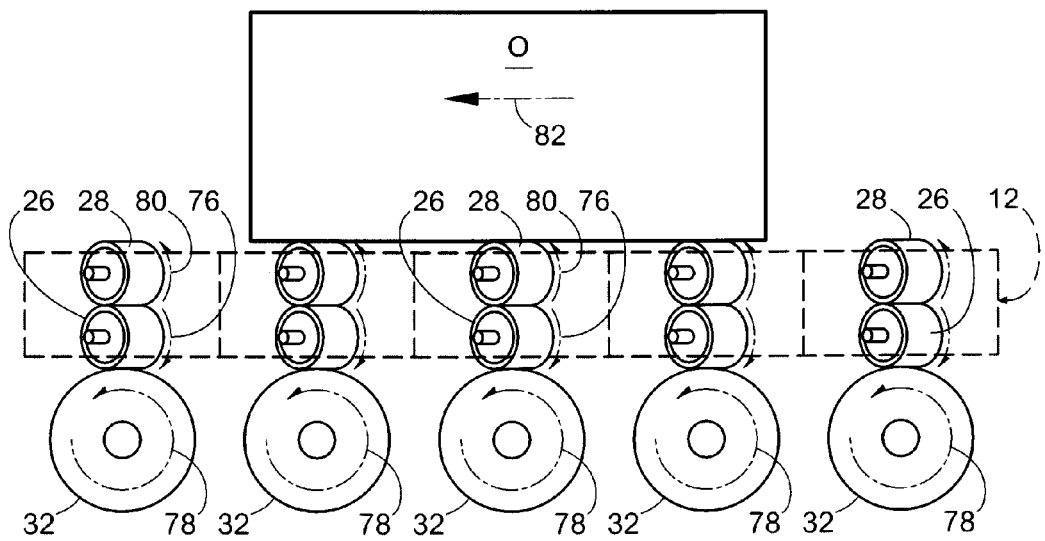
FIG. 4 is schematic end view of the conveyor of FIG. 1, illustrating diverting of an object conveyed by the conveyor.
Figure 5:
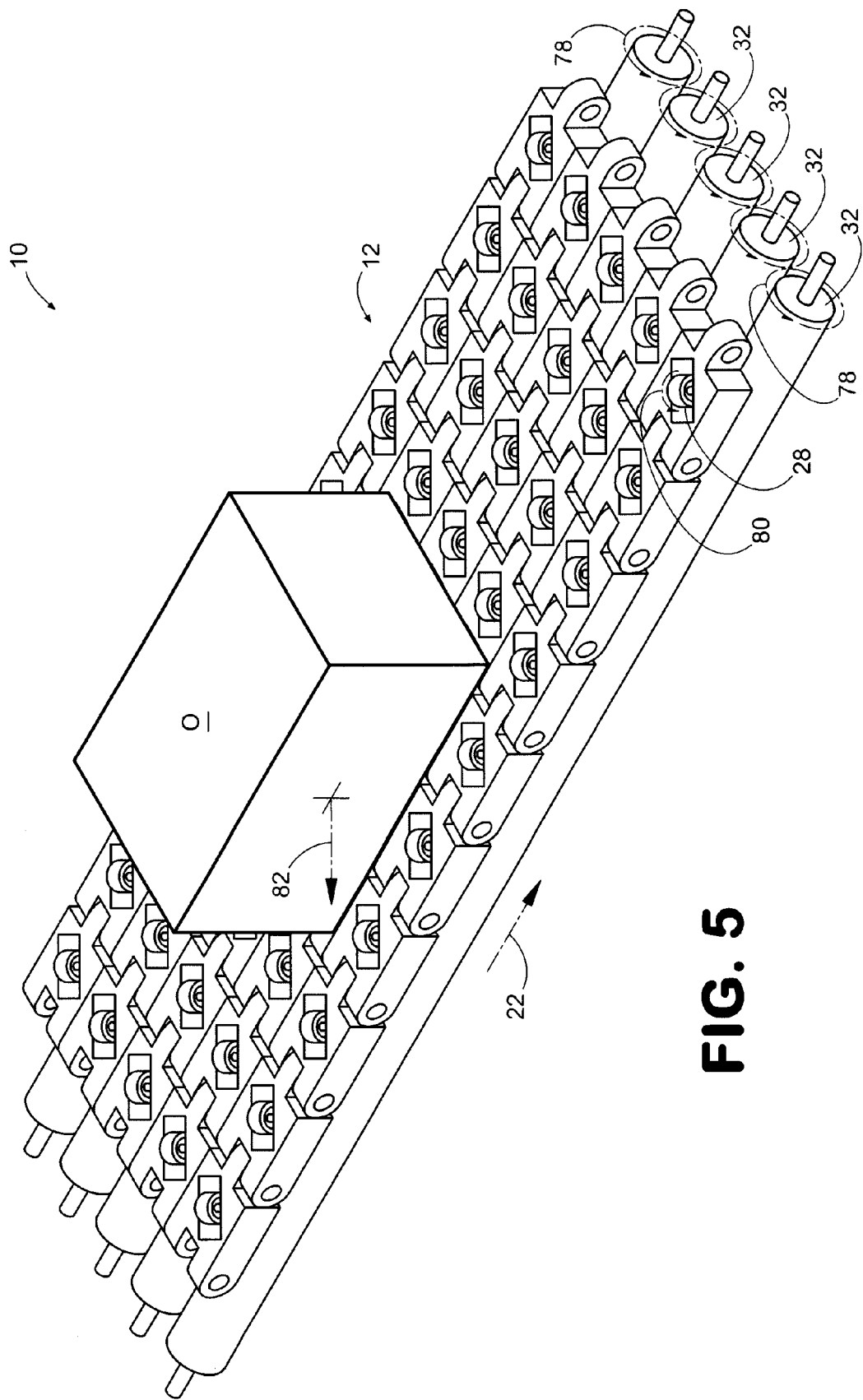
FIG. 5 is a top perspective view of the conveyor of FIG. 1, further illustrating diverting of the object by the conveyor.

FIGS. 4 and 5 illustrate diverting an object O using the conveyor 10. As indicated in FIG. 5, the conveyor belt 12 travels along the longitudinal rollers 32 in the direction of arrow 22. As indicated in FIG. 4, contact between the bottom rollers 26 and the longitudinal rollers 32 causes the bottom rollers to rotate in a downstream direction indicated by arrows 76. In addition, that contact causes the longitudinal rollers 32 to rotate in a counterclockwise direction (when viewed from a downstream position) as indicated by arrows 78. Rotation of the bottom rollers 26 causes the top rollers 28 to rotate in an opposite, upstream direction, indicated by arrows 80. As shown most clearly in FIG. 5, the rotation of the top rollers 28 displaces the object O in a transverse and rearward direction indicated by arrow 82. As used in the previous sentence, the term "rearward direction" is a relative term that indicates that the object O is displaced in a rearward direction relative to the conveyor belt 12. Since the belt 12 is travelling in the direction of arrow 22, however, the object O may not actually travel rearward in an absolute sense. Instead, assuming no slip between the bottom rollers 26 and the longitudinal rollers 32 and further assuming no slip between the top rollers 28 and the object O, the longitudinal position of the object will substantially not change because of the cancellation of its downstream movement by its upstream movement. In such a case, the object O is only transversely displaced by the conveyor 10.

The transverse diverting described above in relation to FIGS. 4 and 5 is illustrated in FIGS. 6A-6D. In those figures, the conveyor belt 12 travels from top to bottom as indicated by arrow 22. Positioned to one side of the conveyor belt 12 is an outfeed conveyor 84. In some embodiments, the outfeed conveyor 84 comprises its own driven conveyor belt so as to be adapted to convey a diverted object in a direction other than that in which the conveyor belt 12 travels. In other embodiments, the outfeed conveyor 84 comprises a non-driven conveyor that, for example, comprises a plurality of free-spinning wheels along which the object can travel, for instance under the force of gravity. Regardless, the outfeed conveyor 84 is adapted to receive objects diverted by the conveyor belt 12.

As indicated in FIG. 6A, an object O travels along the conveyor belt 12 in the direction indicated by arrow 86 and approaches a diverting area 88. Turning to FIG. 6B, once the object O enters the diverting area 88, the object is acted upon by the top rollers 28. In some embodiments, the top rollers 28 are activated in the diverting area 88 by a drive mechanism (not shown) that contacts the bottom rollers 26 of the belt only in the diverting area. In such cases, the bottom rollers 26, and the top rollers 28, will begin to rotate upon entering the diverting area 88. As indicated in FIG. 6B, rotation of the top rollers 28 causes the object O to be displaced in a transverse and rearward direction indicated by arrow 90. As described above, the rearward travel of the object O relative to the belt 12 may be substantially equivalent to forward travel of the object due to movement of the belt. In such cases, the object O does not significantly move forward or rearward in an absolute sense. Accordingly, as indicated in FIG. 6C, the object O is primarily displaced in the transverse direction toward the conveyor 84. In other words, the object O is diverted from the conveyor belt 12 at a diverting angle of approximately 90°. Notably, such a diverting angle is substantially larger than that achievable with other conveyor belts that comprise single rollers that are not provided in a stacked configuration. Continuing on to FIG. 6D, the object O is shown completely diverted from the conveyor belt 12, at which point the object may be carried away by the conveyor 84 in the direction indicated by arrow 92.

The substantially 90° diverting action described above occurs for any angle θ, selected from 1° to 89° (see FIG. 2). Therefore, objects will be diverted from the conveyor belt 12 at an angle of approximately 90° regardless of the angle of the top rollers 28 that is selected, assuming no slip and no gearing effect (described below). The selected angle, however, affects the speed with which the objects will be diverted. Specifically, the larger the angle θ, the faster the object will be diverted. Notably, when the top rollers 28 are positioned at a 45° angle relative to the longitudinal direction of the belt, the objects will be diverted from the belt at a speed approximately equal to the speed of belt travel, again assuming no slip and no gearing effect.

FIG. 7 illustrates an embodiment of a conveyor 100 that can be used to control the positioning of conveyed objects. As indicated in FIG. 7, the conveyor 100 comprises a conveyor belt 102 and a drive mechanism 104 with which the belt can interact. In the embodiment of FIG. 7, the conveyor belt 102 comprises a plurality of conveyor belt modules 106 that are linked together to form the belt. The modules 106 are aligned in transverse rows 108 that extend across a width of the belt 102, and in longitudinal columns 110 that extend along a longitudinal direction of the belt, which coincides with the direction of belt travel indicated by arrow 112. By way of example, the modules 106 are pivotally connected to adjacent modules along the longitudinal direction of the belt 102 with transverse shafts 114. Like the modules 16 shown in FIG. 1, the modules 106 include roller sets that comprise a first or bottom roller 116 and second or top roller 118 that are arranged in a vertically-stacked configuration within an inner space 120 of the modules.

The drive mechanism 104 is used to drive the bottom and top rollers 116, 118 of the conveyor belt modules 106. As indicated in FIG. 7, the drive mechanism 104 can comprise a friction plate that is used to rotate the bottom rollers 116. In at least some embodiments, the friction plate has a high-friction top surface that reduces slip between the plate and the bottom rollers 116.

Figure 8:
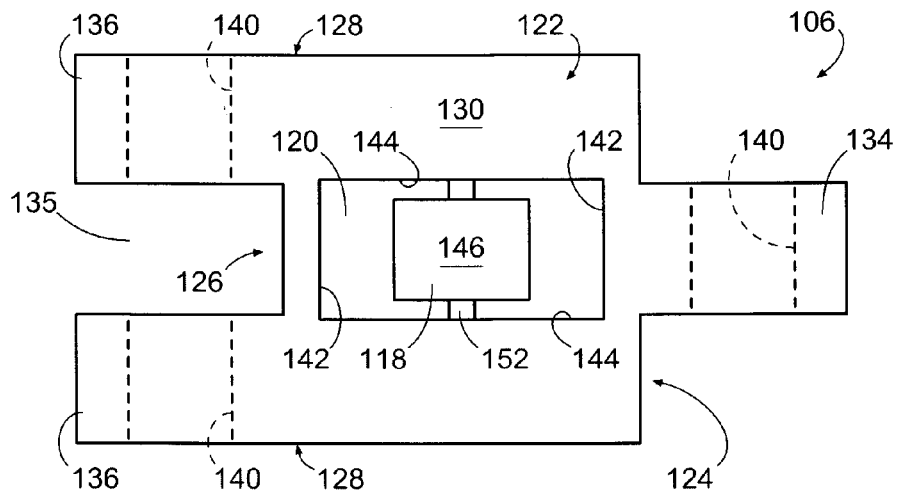
FIG. 8 is a top view of an embodiment of a conveyor belt module used in the conveyor of FIG. 7.
Figure 9:
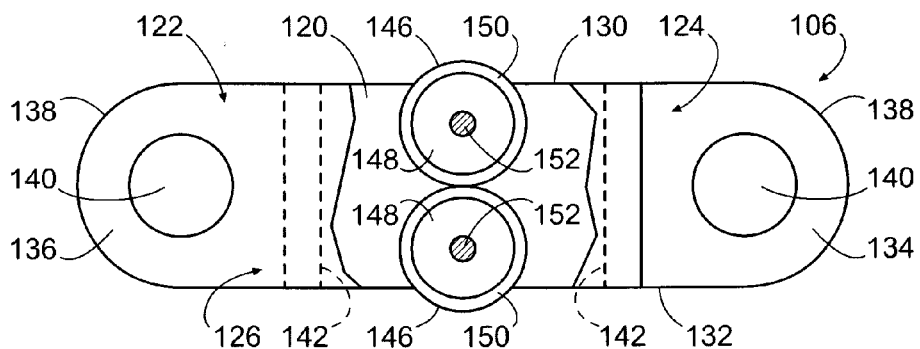
FIG. 9 is side view of the conveyor belt module of FIG. 8.

FIGS. 8 and 9 illustrate an example embodiment for the conveyor belt module 106. The module 106 is similar in many ways to the module 16 illustrated in FIGS. 2 and 3. Therefore, as indicated in FIGS. 8 and 9, the module 106 comprises a body 122 having a front end 124, a rear end 126, and opposed lateral sides 128. Furthermore, the body 122 includes a top surface 130 and a bottom surface 132. Again, the spatial terminology is used to reflect the orientation of the module 106 indicated in FIG. 7 and is not intended to be absolute.

As shown most clearly in FIG. 8, the conveyor belt module 106 further includes connection portions that extend from body 122. In the embodiment of FIGS. 8 and 9, the module 106 comprises a single connection portion 134 that extends from the front end 124 of the body 122 and two connection portions 136 that extend from the rear end 126 of the body separated by a gap 135. As shown most clearly in FIG. 3, each of the connection portions 134, 136 includes a rounded outer surface 138 and a transverse opening 140 that is adapted to receive a transverse shaft, such as shaft 114 shown in FIG. 7. When the diameter of the transverse shaft is smaller than the openings 140, the modules 106 can pivotally rotate relative to the shaft and vice versa.

The module body 122 further defines the inner space 120 first identified in relation to FIG. 7. As indicated in FIG. 8, the inner space 120 can, in some embodiments, comprise a generally rectangular cross-section, when viewed from the top or bottom, defined by opposed side walls 142 and opposed end walls 144. As further indicated in FIG. 8, the side walls 142 of the modules 106 are generally parallel to the lateral sides 128 of the module body 122 and, therefore, are generally parallel to a longitudinal axis of the module.

As is apparent from FIGS. 8 and 9, the bottom and top rollers 116, 118 are at least partially contained within the inner space 120 defined by the module body 122. As indicated in FIG. 9, outer surfaces 146 of the rollers 116, 118 contact each other such that rotation of one roller in a first direction causes opposite rotation of the other roller. A portion of the bottom roller 116 extends below the bottom surface 132 of the body 122 and a portion of the top roller 118 extends above the top surface 130 of the body. With such a configuration, the drive mechanism described in relation to FIG. 7 can contact the bottom roller 116 to cause it to rotate, and objects supported by the conveyor belt in which the module 116 is used can be displaced by the top roller 118.

Each roller 116, 118 can comprise a roller body 148 constructed of a polymeric or metal material that provides structure to the roller, and an outer layer 150 that is provided about an outer surface of the roller body and that forms the outer surface 146. In some embodiments, the outer layer 150 of each roller 116, 118 is composed of a high-friction material that reduces slip with mechanisms and/or objects it contacts.

As illustrated in both FIGS. 8 and 9, each roller 116, 118 is mounted within the inner space 120 on a roller shaft 152 that is supported by the module body 122. In some embodiments, the shafts 152 are supported by openings (not shown) formed in the body 122. In other embodiments, the shafts 152 are supported by brackets (not shown) provided within the inner space 120. Regardless, the shafts 152 are supported such that their associated rollers 116, 118 are placed in firm contact with each other to ensure that rotation of one roller (e.g., the bottom roller) will cause opposite rotation of the other roller (e.g., the top roller). As further illustrated in both FIGS. 8 and 9, the shafts 152 are oriented so as to be substantially perpendicular to the longitudinal axis of the module 106 and the conveyor belt in which it is used.

Figure 10:
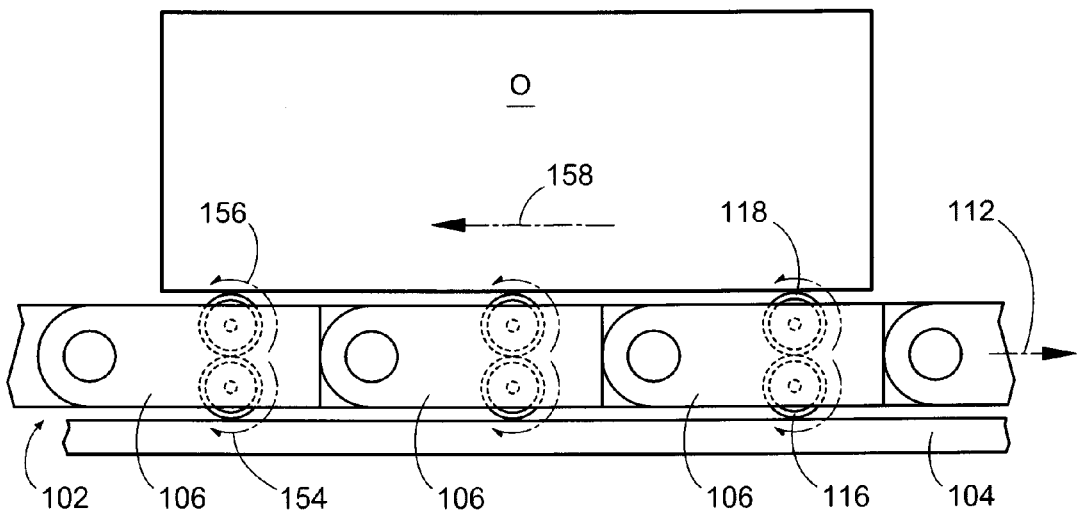
FIG. 10 is a side view of the conveyor of FIG. 7, illustrating displacing of an object conveyed by the conveyor.
Figure 11:
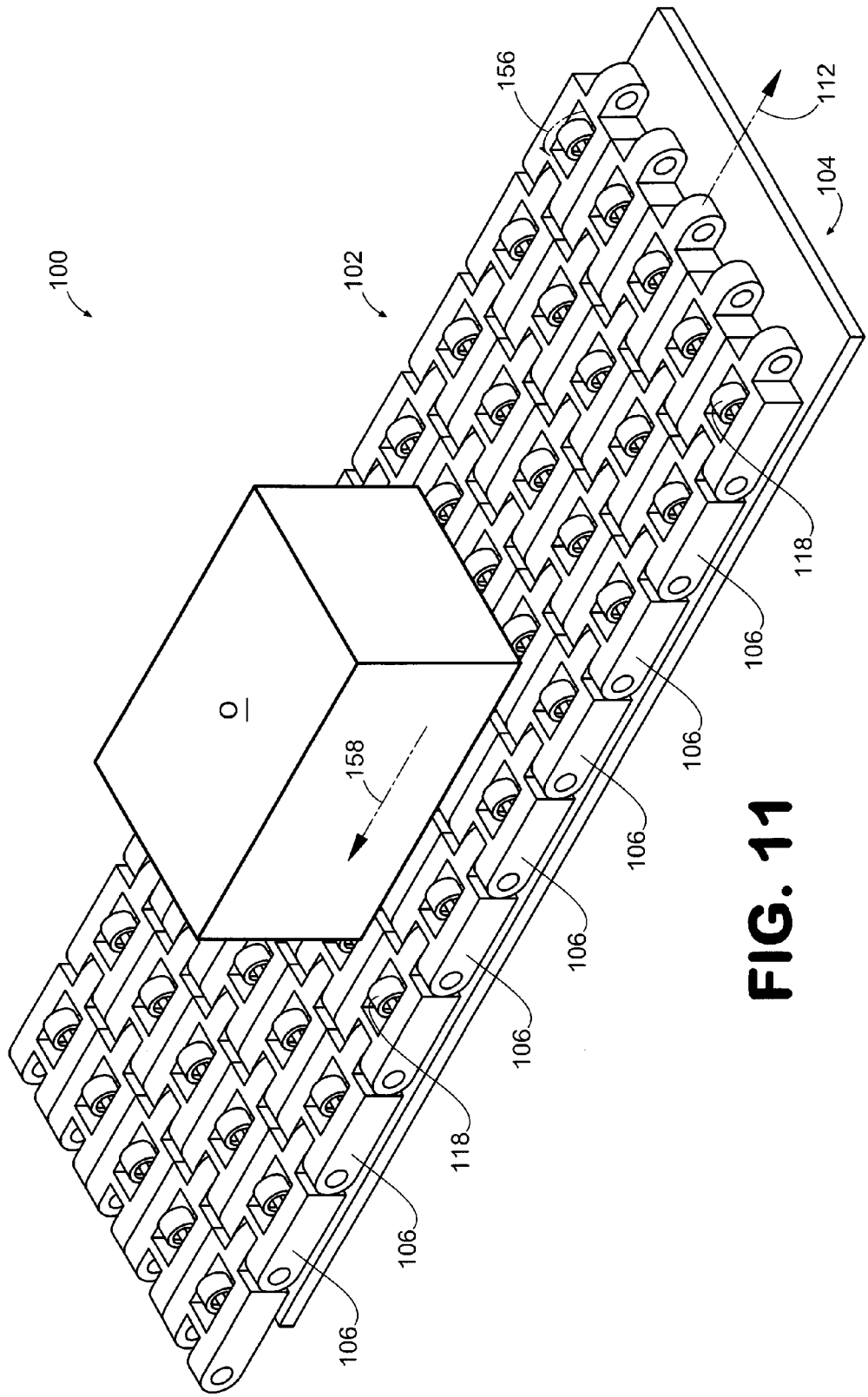
FIG. 11 is a top perspective view of the conveyor of FIG. 7, further illustrating displacing of the object by the conveyor.

FIGS. 10 and 11 illustrate displacement an object O on the conveyor 100. As indicated in FIG. 11, conveyor belt 102 travels along the drive mechanism 104 in the direction of arrow 112. As indicated in FIG. 10, contact between the bottom rollers 116 and the drive mechanism 104 causes the bottom rollers to rotate in a downstream direction indicated by arrows 154. Rotation of the bottom rollers 116 causes the top rollers 118 to rotate in an opposite, upstream direction, indicated by arrows 156. As shown in both FIGS. 10 and 11, the rotation of the top rollers 118 displaces the object O in a rearward direction relative to the belt 102 indicated by arrow 158. Assuming no slip between the bottom rollers 116 and the drive mechanism 114 and further assuming no slip between the top rollers 118 and the object O, the absolute position of the object will substantially not change because of the cancellation of its downstream movement by its upstream movement. In such a case, the object O will be held in place in an absolute sense. With such functionality, the transport of objects provided on the belt 102 can be selectively stopped by engaging the drive mechanism 104 with the bottom rollers 116 of the belt at a location at which the object is to be halted.

FIGS. 12 and 13 depict two rows of belt modules 199 in a modular conveyor belt 200 having rollers sets 201, each comprising an elongated top roller 202 and a bottom roller 204. The bottom rollers 204 reside in cavities 206 on the modules 199. The bottom rollers 204 protrude beyond a bottom side 208 and an opposite top side 209 of the conveyor belt 200. The elongated top rollers 202 are mounted for rotation on axles 210 whose ends are fixedly supported in supports 212 upstanding from the top side 209 of the conveyor belt 200. In this way, the top rollers lie entirely above the top surface of the belt. The axles 210 define axes of rotation 214 oblique to a direction of travel 215 of the conveyor belt 200. The bottom rollers are mounted in the cavities 206 on axles whose axes of rotation are parallel to the axes of rotation of the top rollers 202. In each roller set 201, the top roller 202 has an elongated cylindrical body that is axially longer than the bottom roller 204. A central peripheral surface 216 of the top roller frictionally engages the outside of the bottom roller. When contacted by a drive mechanism, such as an underlying bearing surface, for example, the outer periphery of an actuating roller or a carryway pan or wearstrips, the bottom rollers 204 ride in rotation along the bearing surface as the conveyor belt advances. When the conveyor belt 200 advances in the direction of belt travel 215, the bottom rollers 204 rotate in a first direction perpendicular to its axis of rotation. Contact between the bottom rollers and the top rollers causes the top rollers to rotate in an opposite direction 218 from the rotation of the bottom rollers. To reduce wear between the bottom roller and the top roller, the central peripheral surface 216 of the top roller, which contacts the outside of the bottom roller, is made of a wear-resistant, durable material, which may also be a low-friction material, such as a high-durometer polyurethane or acetal.

As shown in FIGS. 14 and 15, the top roller 202 can be made of a durable, low-friction core 220 having a large-diameter central portion 222 forming the central peripheral surface 216 and a pair of reduced-diameter portions 224 flanking the central portion. One way of making the core is by thermoplastic injection molding. A bore 226 extending axially through the core accommodates an axle. Resilient, high-friction bands 228 affixed to the reduced-diameter portions 224 of the core 220 form high-friction outer peripheral surfaces 230 that are generally flush with the central peripheral surface 216, but could extend beyond the periphery of the central portion 222. The high-friction bands 228 are affixed to the low-friction core 220 by adhesives, by co-molding, by overmolding, or by compression fitting. The bands, which do not contact the bottom roller, present high-friction peripheral surfaces that better engage the bottoms of conveyed objects. Thus, the periphery of the two-material top roller in this example is divided into a low-friction peripheral surface and a pair of flanking high-friction peripheral surfaces having a higher coefficient of friction.

Another version of an elongated top roller is shown in FIG. 16. The elongated cylindrical body of the top roller 232 has a central portion 234 with a durable, low-friction peripheral surface 236. The entire central portion could be made of the same material. Axle stubs 238 formed with or retained in the central portion extend axially outward of the central portion. Flanking end portions 240 having high-friction peripheral surfaces 242 and axial bores 244 are affixed to the axle stubs 238 by press-fitting or adhesives. Each of the end portions could be made entirely of one high-friction material, such as rubber or an elastomer. The end portions are separated from the central portion on the axle stubs by a small gap to accommodate arms 244 on the supports 212. The axle stubs are retained rotatably in receptacles 246 in the arms.

Another version of the elongated top roller of FIG. 16 is shown in FIG. 17. The elongated roller 246 comprises a low-friction core 248 and with a high-friction covering 250 forming high-friction peripheral surfaces 252. The core 248 includes a central large-diameter portion 254 formed together with a pair of flanking, reduced-diameter end portions 255 and axle portions 256 between them. All these portion of the core are formed by injection molding a low-friction thermoplastic polymer. In this way, the large-diameter portion of the core 248 presents a low-friction peripheral surface 258 between the two high-friction peripheral surfaces 252. The high-friction coverings 250 can be co-molded onto the reduced-diameter end portions 255 in a continuous molding process, overmolded onto the end portions, bonded by adhesives to the end portions, or compression fitted to the end portions.

While particular embodiments have been disclosed in detail in the foregoing description and drawings for purposes of example, it will be understood by those skilled in the art that variations and modifications thereof can be made without departing from the scope of the disclosure.

What is claimed is:
1. A conveyor belt comprising:
a top side and an opposite bottom side;
multiple roller sets, each roller set including a top roller at the top side and a bottom roller below the top roller, the top and bottom rollers mounted for rotation on parallel axes, the top roller having a periphery divided into a high-friction peripheral surface and a durable, low-friction peripheral surface, wherein the bottom roller contacts the durable, low-friction peripheral surface of the top roller such that driving of the bottom roller in a first direction causes rotation of the top roller in an opposite second direction.

2. A conveyor belt as in claim 1 wherein the high-friction peripheral surface is divided into two portions axially flanking the durable, low-friction peripheral surface.

3. A conveyor belt as in claim 2 wherein the top roller is segmented between the durable, low-friction peripheral surface and the two portions of the high-friction peripheral surface.

4. A conveyor belt as in claim 2 further comprising supports at the top side and wherein the top roller includes small-diameter axle portions between the durable, low-friction peripheral surface and the two portions of the high-friction peripheral surface, wherein the axle portions are rotatably retained by the supports.

5. A conveyor belt as in claim 1 wherein the top roller is made of a durable, low-friction material having a maximum diameter defining the durable, low-friction peripheral surface and a reduced-diameter portion covered with a high-friction material that forms the high-friction peripheral surface.

6. A conveyor belt as in claim 1 wherein the top and bottom rollers have parallel axes of rotation and the top roller is axially longer then the bottom roller.

7. A conveyor belt as in claim 1 further comprising cavities in the belt opening onto the top and bottom sides, wherein the bottom roller of each of the roller sets resides in one of the cavities and protrudes beyond the bottom side.

8. A conveyor belt as in claim 1 wherein the bottom roller of each of the roller sets protrudes beyond the top side and wherein the top roller is supported entirely above the top side in contact with the bottom roller.

9. A conveyor comprising a conveyor belt as in claim 1 and a drive mechanism underlying the conveyor belt and contacting the bottom roller from below bottom side to cause the bottom roller to rotate in the first direction and the top roller to rotate in the opposite second direction.

10. A conveyor belt module as in claim 1 wherein the durable, low-friction peripheral surface has a lower coefficient of friction than the high-friction peripheral surface.

11. A conveyor belt module comprising:
a top side and an opposite bottom side;
one or more cavities extending through the thickness of the module and opening onto the top and bottom sides;
a set of top and bottom rollers associated with each of the cavities, each bottom roller received in one of the cavities and each top roller being affixed to the belt module over the cavity and in contact with the bottom roller;
wherein the top roller has a periphery divided into a high-friction peripheral surface and a durable, low-friction peripheral surface, the bottom roller contacting the durable, low-friction peripheral surface.

12. A conveyor belt module as in claim 11 wherein the high-friction peripheral surface of the top roller is divided into two portions axially flanking the durable, low-friction peripheral surface.

13. A conveyor belt module as in claim 12 wherein the top roller includes small-diameter axle portions between the durable, low-friction peripheral surface and the two portions of the high-friction peripheral surface.

14. A conveyor belt module as in claim 11 wherein the top roller is made of a durable, low-friction material having a maximum diameter defining the durable, low friction peripheral surface and a reduced-diameter portion covered with a high-friction material that forms the high-friction peripheral surface.

15. A conveyor belt module as in claim 11 wherein the top and bottom rollers have parallel axes of rotation and the top roller is axially longer then the bottom roller.

16. A conveyor-belt roller for rolling contact with another roller, the conveyor-belt roller comprising a cylindrical body elongated along an axis of rotation and having a periphery divided into a central durable, low-friction peripheral surface flanked axially by two high-friction peripheral surface portions, the conveyor-belt roller further comprising small-diameter axle portions between the central durable, low-friction peripheral surface and the two portions of the high-friction peripheral surface.

17. A conveyor-belt roller as in claim 16 wherein the roller body is made of a durable, low-friction material having a maximum diameter defining the central durable, low-friction peripheral surface and a reduced-diameter portion covered with a high-friction material that forms the high-friction peripheral surface.

18. A conveyor-belt roller as in claim 17 wherein the high-friction material is in the form of a resilient band tightly encircling the reduced-diameter portion.

19. A conveyor-belt roller as in claim 17 wherein the high-friction material is bonded to the reduced-diameter portion made of the durable, low-friction material.

20. A conveyor-belt roller as in claim 19 wherein the high-friction material is over-molded over the durable, low-friction material.

21. A conveyor-belt roller as in claim 19 wherein the high-friction material is co-molded over the durable, low-friction material.

22. A conveyor-belt roller as in claim 19 wherein the high-friction material is bonded to the durable, low-friction material by an adhesive.

23. A conveyor-belt roller as in claim 16 wherein the roller is segmented between the central durable, low-friction peripheral surface and the two portions of the high-friction peripheral surface.

\* \* \* \* \*